Dec. 31, 1957  F. L. LITTLE, JR  2,818,317
AUTOMOBILE HANGING DESK OR TABLE
Filed Nov. 29, 1956  4 Sheets-Sheet 1
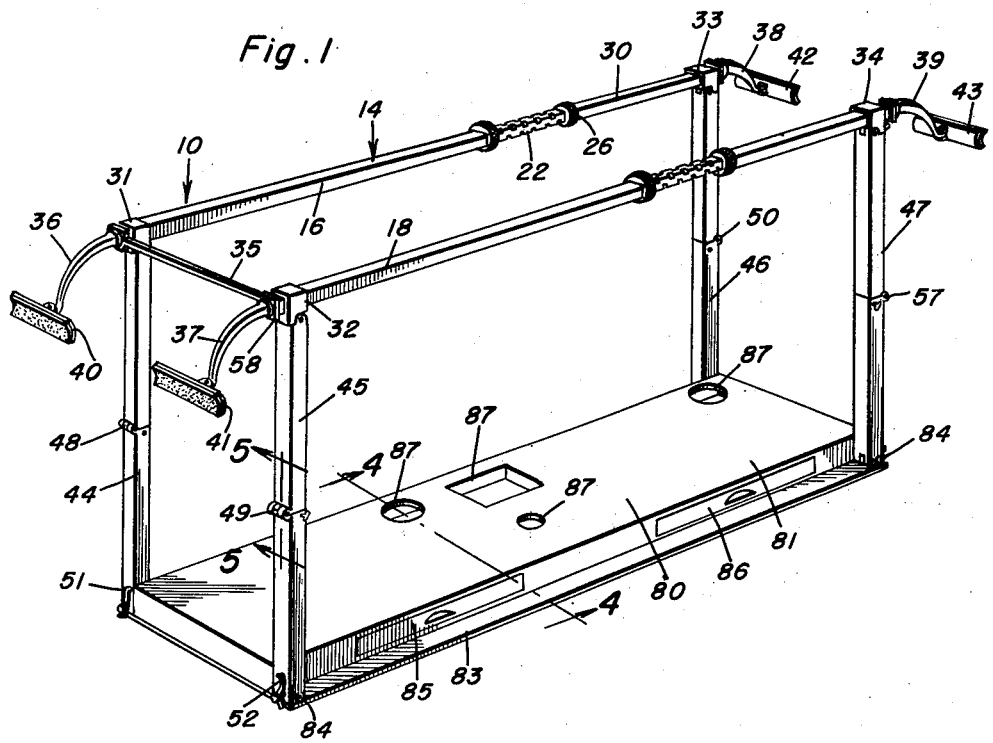
Frank L. Little, Jr.
INVENTOR.

Dec. 31, 1957  F. L. LITTLE, JR  2,818,317
AUTOMOBILE HANGING DESK OR TABLE
Filed Nov. 29, 1956  4 Sheets-Sheet 2
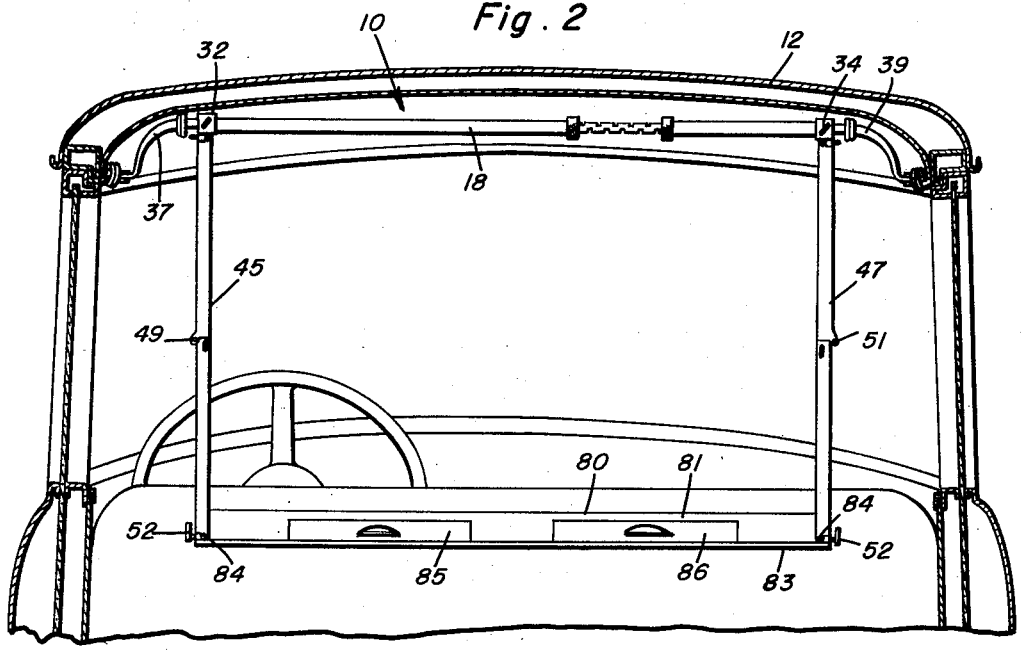
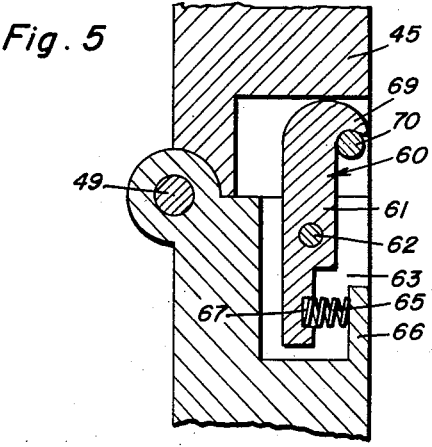
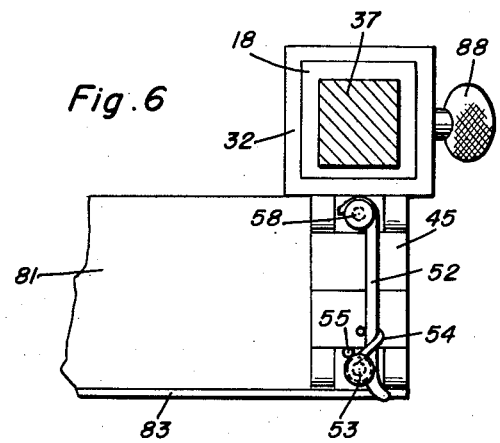
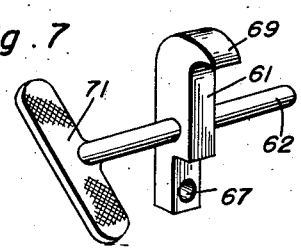
Frank L. Little, Jr.
INVENTOR.

Dec. 31, 1957     F. L. LITTLE, JR     2,818,317
AUTOMOBILE HANGING DESK OR TABLE
Filed Nov. 29, 1956     4 Sheets-Sheet 3
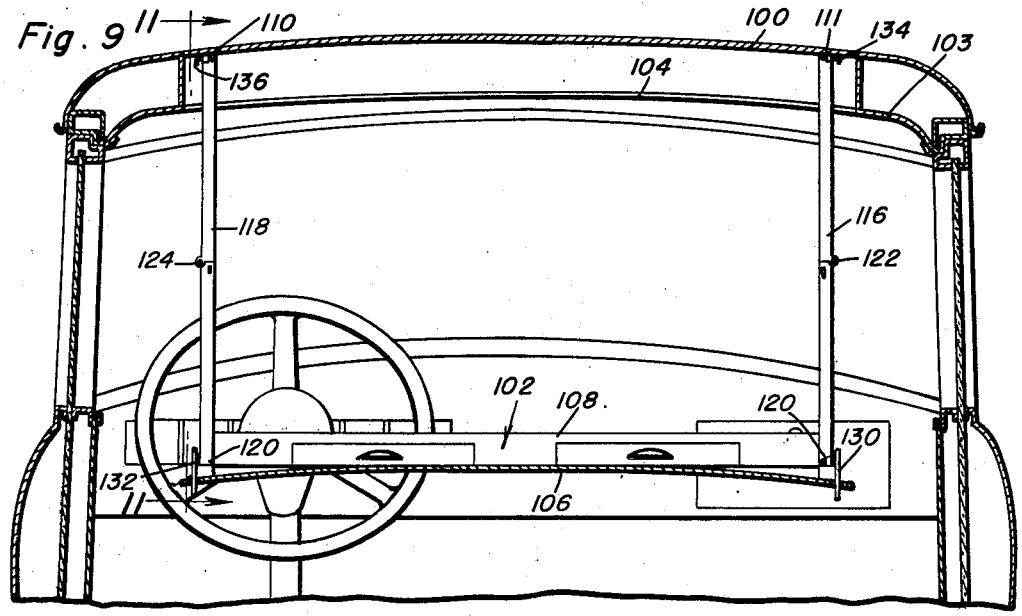
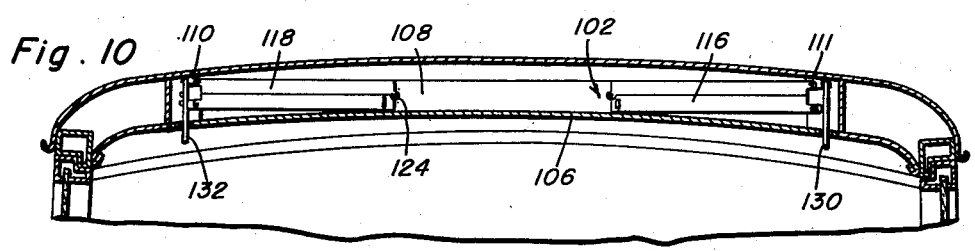
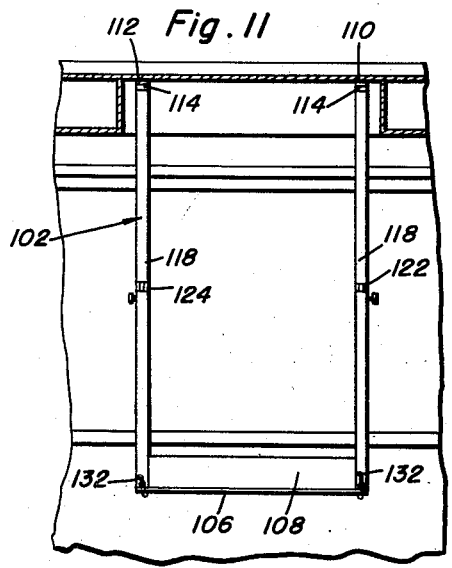
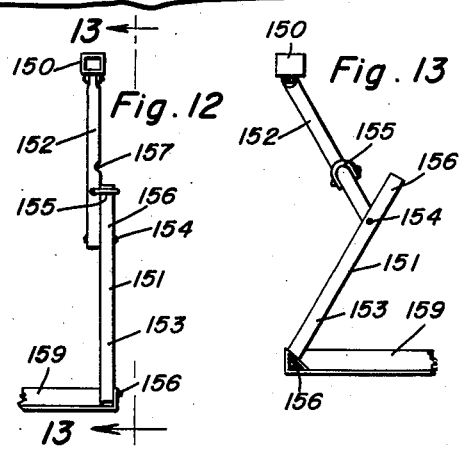
Frank L. Little, Jr.
INVENTOR.
BY *(signatures)*
Attorneys Dec. 31, 1957     F. L. LITTLE, JR     2,818,317
AUTOMOBILE HANGING DESK OR TABLE
Filed Nov. 29, 1956     4 Sheets-Sheet 4
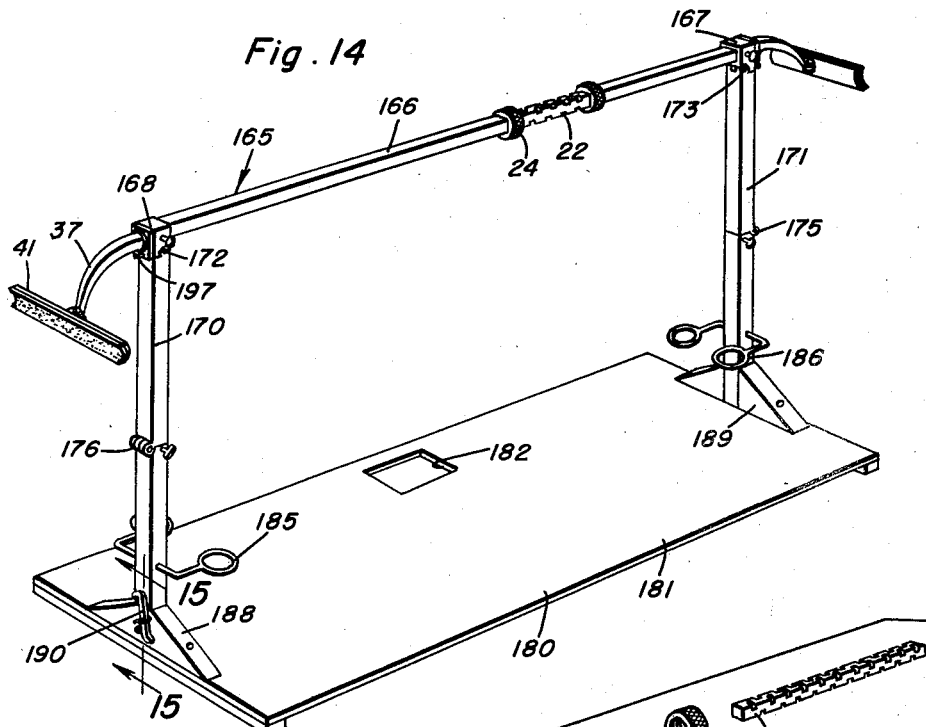
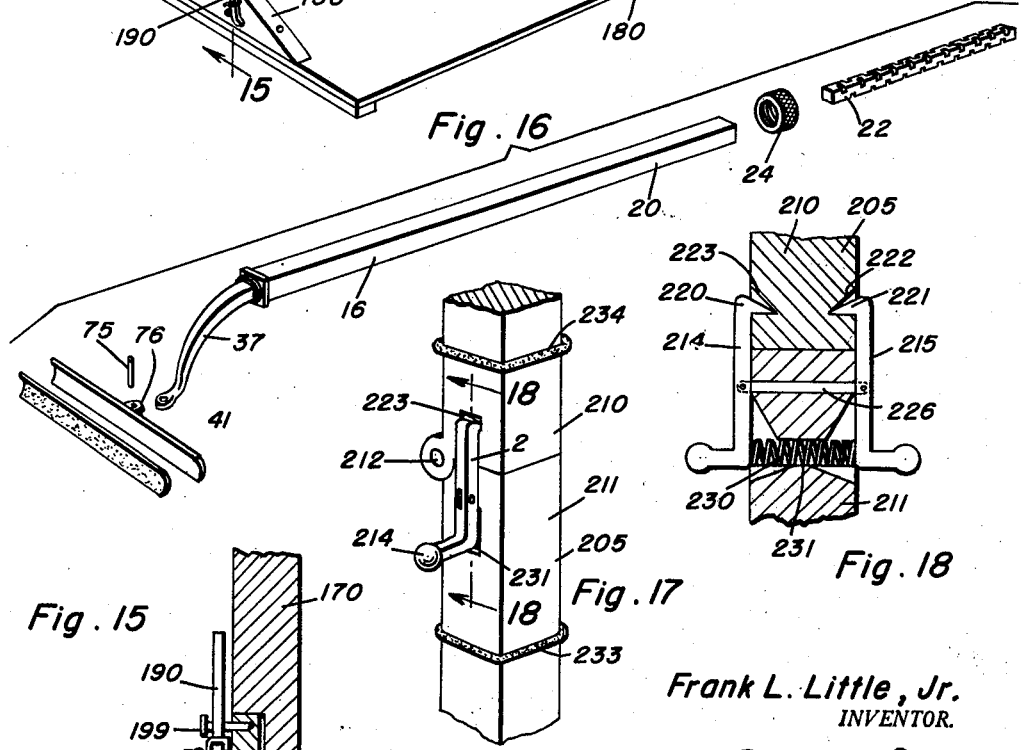
Frank L. Little, Jr.
INVENTOR.
BY 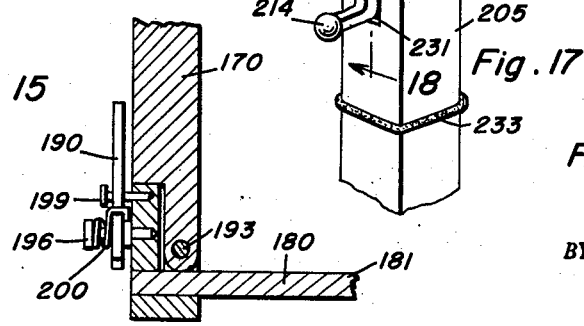
Attorneys United States Patent Office 2,818,317
Patented Dec. 31, 1957

2,818,317

AUTOMOBILE HANGING DESK OR TABLE

Frank L. Little, Jr., Greenville, N. C.

Application November 29, 1956, Serial No. 625,123

3 Claims. (Cl. 311—21)

This invention relates to an appliance which is adapted to be used in a motor vehicle to facilitate writing, eating, storage of small articles and other functions.

The primary purpose of the invention is to provide an appliance for the interior of an automotive vehicle to enable one or more occupants of the motor vehicle to spend his or her time in performing duties or other acts while the car is in motion whereby the operator of the vehicle and the occupants will derive increased enjoyment in their employment, hobbies and other activities.

A further object of the present invention is to provide an appliance for a motor vehicle which is either installed as original equipment or which is in the nature of an attachment, the appliance having a storage facility as well as a writing surface and adapted to be pulled down from above that is, from an overhead position to an operative position in front of an occupant of the motor vehicle.

A further object of the present invention is to provide such an appliance but of an improved structure capable of adjustment in the attachment models to suit the various dimensioning of the motor vehicles of different manufacturer's make and to suit the original contour of the motor vehicle headliner when installed as original equipment, the appliance being characterized by its simplicity of construction and by the manner of folding to inoperative position enabling the appliance to mist very unobtrusively in an overhead position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of an appliance which is constructed in order to exemplify the principles of the invention, this appliance being adapted to fit various types of motor vehicles and being in the nature of an attachment;

Figure 2 is a cross-sectional view showing fragmentarily the interior of a motor vehicle fitted with the appliance of Figure 1 and in the usable position;

Figure 3 is a fragmentary sectional view of the motor vehicle of Figure 2 showing the appliance in the folded, inoperative position;

Figure 4 is a transverse sectional view in enlarged scale taken on the line 4—4 of Figure 1;

Figure 5 is an enlarged sectional view taken on the line 5—5 of Figure 1;

Figure 6 is an enlarged sectional view taken on the line 6—6 of Figure 3;

Figure 7 is a perspective view of a latch which constitutes a part of the construction of Figure 1;

Figure 8 is a perspective view of another latch which is part of the construction of Figure 1 and shown again in Figure 6;

Figure 9 is a transverse sectional view of another motor vehicle having an appliance fitted therein and in the usable position, the appliance being installed as original equipment in the motor vehicle of Figure 9;

Figure 10 is a cross-sectional view showing the motor vehicle of Figure 9 fitted with the appliance but the appliance being in a collapsed, inoperative and concealed or essentially concealed position;

Figure 11 is a sectional view taken on the line 11—11 of Figure 9;

Figure 12 is a fragmentary elevational view of a modification of the invention;

Figure 13 is an elevational view taken approximately on the line 13—13 of Figure 12;

Figure 14 is a perspective view of a further modification of the invention;

Figure 15 is an enlarged sectional view taken on the line 15—15 of Figure 14;

Figure 16 is an exploded perspective view of a part of the overhead support for the appliance of Figure 1 or the appliance of Figure 14;

Figure 17 is an enlarged fragmentary sectional view of a part of one of the supports of Figure 14; and Figure 18 is a sectional view taken on the line 18—18 of Figure 17.

In the accompanying drawings there are several modifications of the appliance which is adapted to be fitted in a motor vehicle. More particularly, it is intended that the appliance of the invention be installed in the top of the motor vehicle in such way that it is capable of being pulled down to an operative position either in the front or the back or both, depending on the prerogative of the manufacturer or the individual owner of the motor vehicle. Not only does the appliance provide additional storage space, a facility to accommodate bottles, boxes or other containers, but it also provides a writing or support surface whereon to eat, write or perform various and sundry other services. The services that the appliance is capable of performing are so numerous that it would be impossible to mention them herein. Suffice it to say, then, that the appliance will be used in accordance with the desires and prerogative of the owner thereof.

The appliance 10 of Figure 1 illustrates one form of the invention. It is adapted to be fitted at the top 12 of a motor vehicle and either in the front or the back thereof. Appliance 10 consists of an upper support 14 made of two extensible bars 16 and 18 respectively. Each extensible bar is of similar construction. Attention is invited to Figure 16 where extensible bar 16 is shown in detail. It comprises a tube 20 which is preferably non-circular in cross-section and hollow in order to accommodate the screw 22. The screw is of similar cross-sectional shape and fits telescopically in the tube 20. Nut 24 preferably having a cylindrical, knurled surface, is threaded on screw 22 and abuts the end of tube 20. There is a similar nut 26 on screw 22 (Figure 1) nut 26 fitting in tube 30 which is of a construction similar to the tube 20. Accordingly, the extensible rods 16 and 18 may be extended or retracted in order to install the appliance in a motor vehicle and also to take into consideration and compensate for the various width dimensions of motor vehicles constructed by different manufacturers and constructed in different models.

There are four sockets 31, 32, 33 and 34 respectively at the ends of the extensible rods 16 and 18. These sockets are secured in place and at least one pair has a transverse cross member 35 connected thereto to hold the upper support 14 as a unified, rigid framework. Curved arms 36, 37, 38 and 39 are secured to the sockets and the outer extremity of each accommodates the padded feet 40, 41, 42 and 43 respectively. The cross-section of each foot is a channel in order to press tightly on the lateral edges of the headliner of the motor vehicle, these edges usually having a bead therearound. Thus, the support functions as a hanger for the appliance.

There are four legs of similar construction. Legs 44, 45, 46 and 47 are each attached pivotally to the four sockets 31, 32, 33 and 34 and the legs themselves are foldable about the four hinges 48, 49, 50 and 51 intermediate the lengths of each leg. By virtue of the hinges the appliance may be folded to the position shown in Figure 3 when it is not in use. It is held in that position by four latches such as those at 51 and 52. The latch 52 shown in detail in Figure 6, is mounted on a pivot 53 carried at the lower extremity of the leg 45 and is biased by spring 54 in one direction at all times. Stop pin 55 secured to the lower part of leg 45, limits the extent of travel of the latch 52 in one direction. The latch has an offset aperture 56 (Figure 8) in which pivot pin 53 is mounted, and the spring is wrapped around the pivot 53 and is hooked onto the shank of the latch 52. The bill 57 of the latch is adapted to engage latch keeper 58 that is fixed to the socket 32. Accordingly when the four legs 44, 45, 46 and 47 are collapsed that is, hinged inwardly and the appliance is moved to the inoperative position (Figure 2) the latches, as at 51 and 52, automatically locked the appliance in place and it remains that way until such time that the latches are manually released allowing the appliance to be gravity lowered.

In order to latch the appliance in the down position, there are latches connected to each leg at the intermediate hinges therein. For example one of these latches 60 is shown in detail in Figure 5. It consists of a latch keeper 61 mounted on a pivot 62 and located in a recess 63 formed in both the upper and lower sections of the leg 45. The latch keeper 61 is biased by means of spring 65 to a locking position, the spring reacting on a shoulder 66 in recess 63 and having an end seated in a pocket 67 that is formed in the latch 61. Latch 61 has a bill 69 which is operatively connectible with latch keeper 70 carried by the upper part of the leg 45.

When each leg is moved from the folded position to the extended position the latches as at 60 automatically engage and hold the legs in the extended position. In order to release the latches, thumb handles 71 are rotated, these handles being fixed to the pivot 62, and the pivot is fixed to the latch 61.

As previously indicated the hanger structure for the appliance is capable of some adjustment in order to compensate for various types of motor vehicles and more particularly, the upper dimensioning thereof. It is for this reason that the feet 40, 41, 42 and 43 are each mounted for pivotal movement about a vertical axis, this being accomplished by having each foot mounted on a pivot pin, for example see pivot pin 75 for the foot 41 in Figure 16. The pivot pin 75 passes through aligned openings in the mounting brackets 76 on foot 41 and in the extremity of arm 37. However, the lower extremities of the legs of the appliance need not be so compensated. The lower extremity may be fitted with certain types of equipment and variations of equipment that suit particular professions or trades or hobbies. For example, the salesman may desire to store papers, samples, etc. in an effective manner. An engineer may desire to have his appliance suited to hold blueprints. The hobbyist may wish to have his appliance especially constructed to suit the hobby which he enjoys. All of these are mere examples of numerous variations. One of the principal uses will be to provide a surface as at 80 on which to write and hold objects. Therefore a table top 81 has an entablature 82 depending therefrom and resting on a support panel 83. The support panel is connected by hinges 84 to lower extremities of the legs 44, 45, 46 and 47 enabling the panel 83 and a table which is rigidly secured thereto, to be elevated and lowered. Drawers 85 and 86 are slidably disposed in the table top and both bottle and container apertures 87 of any shape and size are formed in the table top to accommodate the various articles.

In the above described appliance 10 as in all of the subsequently described appliances which are to be used in connection with motor vehicles after original manufacture, reliance need not be had solely on the screw 22 and its nuts to achieve adjustment. The sockets 31, 32 33 and 34 may be attached to the extensible rods 15 and 17 by having non-circular bores through which the extensible rods pass. In that case, set screws 88 carried by the sockets and bearing against the extensible rods will hold the arms 36, 37, 38 and 39 in selected positions with respect to the extensible rods. This provides for further adjustment.

Reference is now made principally to Figures 9–11 where the motor vehicle 100 is fitted with an appliance 102, the latter being installed as original equipment in the motor vehicle. Therefore the headliner 103 has an opening 104 in it and the bottom panel 106 beneath the table top 108 is curved, shaped and otherwise configured to fit within the opening 104 and match with the surrounding headliner.

The supporting structure for the appliance 102 consists of a number of blocks, for example blocks 110, 111 and 112 which are welded or otherwise rigidly secured to the inner surface of the roof 100. Four legs are attached to the support structure by hinges as 114. The four legs are in pairs 116 and 118 respectively, there being two legs at opposite ends of the panel 106 and connected thereto by means of hinges 120 which attach to the table top 108, the table top being attached to the panel 106. Each leg of the pairs 116 and 118 is made of an upper and lower section as are the previously described legs in connection with the appliance 10. Hinges 122 and 124 connect the sections together for hinged movement, while latches similar to those seen in Figure 5 operate in the same way in connection with the legs of the pairs 116 and 118 as the latches 60 operate with the four legs of the appliance 10. Latches 130 and 132 for the two pairs of legs are pivoted to the legs at the lower ends thereof and pass through apertures in the panel 106 for manual operation of the latches. They coact with latch keepers, for example pins 134 and 136 carried by the support structure of the appliance. Latches 130 and 132 are very similar in construction and identical in function to the latches 52 of Figure 6. Table 108 is constructed and arranged like the table top of Figure 10 subject to the various modifications that may be made in connection therewith.

Attention is now directed to Figures 12 and 13 where a further modification of the invention is shown. Here, the supporting structure 150 is adapted to attach within the motor vehicle by the means disclosed in Figure 1 or Figure 16 or to be applied directly to the motor vehicle as shown in Figure 9. In any event this modification of Figures 12 and 13 shows a different type of leg 151. It consists of an upper section 152 and a lower section 153 connected together by a much more simple hinge pin 154 that passes through aligned bores in the sections 152 and 153. A generally U-shaped hook 155 pivoted at both ends to the upper section 152, is adapted to be extended over the extremity 156 of the lower section 153 and hold it parallel to the upper section when the legs are in the extended position. When the legs are to be folded, the hook 155 is folded back so that the cross part of the generally U-shaped hook fits in a notch 157 formed in the upper section or part 152 of the leg.

In this embodiment, as in all others, the lower extremity of the leg 151 is connected by a hinge 158 to the table top 159.

Reference is now made to Figures 14–18 where appliance 165 is shown in detail. This appliance consists of the support structure 166 which is shown in mere image in Figure 16. Extensible rod 16 is identically reproduced in Figure 14 and is slidably passed through aligned bores in sockets 168 and 169 whose function also is to hingedly mount the legs 170 and 171. Hinges 172 and 173 are used for this purpose, each leg 171 being of sectional construction including an upper and lower part. Hinges 175 and 176 connect the parts of the legs together and enables them to be adjusted to a folded position or to an extended position. Latches which are the same for each leg are operatively connected to the legs 170 and 171, it being understood that the latch 60 of Figure 5 may be reproduced in legs 170 and 171.

Appliance 165 shows that the table top 180 need not be as complete as the previously described tables. It may consist of a panel 181 either with or without openings 182 to accommodate specific objects. Legs 170 and 171 may be used to function as means on which to support object hangers 185 and 186. They comprise wire supports with eyes at the ends thereof in which to accommodate objects.

The lower ends of the legs 170 and 171 are supported by braces 188 and 189 as they are attached to the table 180. Latches 190 are pivoted to the braces near the hinge pins 193 (Figure 15) which secure the legs 170 and 171 to the table top. Latches 190 are similar to latches 52 in both construction and function and have corresponding structural counterparts, for example the hinge pin 196, the latch keeper 197 on socket 168, the stop 199 and spring 200.

In Figures 17 and 18 a modification of the latch between the upper and lower parts or sections of legs 205, is illustrated. Leg 205 has an upper part 210 and a lower part 211 connected together by means of hinge 212. Near hinge 212 there are a pair of latches 214 and 215, this pair having bills 220 and 221 that are seated in notches 222 and 223. The latches 214 and 215 are mounted on a common pivot member 226 in the lower part 211 of leg 205 while the notches 222 and 223 are in the upper part 210 of the leg. A common spring 230 in transverse bore 231 of lower part 211 of leg 205, presses on the two latches 214 and 215 and constantly biases them to the position where the bills thereof are engaged with the notches 222 and 223. This makes for a far superior latching construction where tight secure locking is desired.

Various expedients may be resorted to without departing from the invention. For example in the embodiment of Figures 17 and 18 there are rubber bumpers in the form of bands 233 and 234 which extend around the upper and lower parts of the legs. These bumpers function as anti-rattle devices and may be used not only in the embodiment of Figures 17 and 18 but in any of the other embodiments which have been either described or illustrated and described. Such other expedients as fall within the scope of the following claims may be resorted to without departing from the invention.

What is claimed as new is as follows:

1. An appliance for use in an automobile as a hanging support for various articles comprising a pair of elongated horizontal tubes having confronting inner ends and outer downwardly curved ends and endwise movable away from each other, channeled cross feet pivoted on said outer ends for clamping engagement with opposite sides of an automobile head liner to hold said tubes in elevated position, screw feed means for moving said tubes away from each other slidably connecting said inner ends of the tubes, sockets slidable on said tubes adjacent the outer ends thereof, a table below said tubes, a pair of legs comprising hinged together sections hinged to said sockets and to said table for folding upwardly to elevate the table, and latch means on said table and tubes for holding said legs folded and said table elevated.

2. An appliance as in claim 1, said screw feed means comprising a screw threaded bar on which the inner ends of the tubes are slidable, and a pair of nuts on said bar for screw feed thereon against said inner ends.

3. An appliance as in claim 2, said tubes and said bar being of square cross section to prevent relative turning of said tubes and bar.

References Cited in the file of this patent

UNITED STATES PATENTS

| | | |
|---|---|---|
| 1,819,516 | Kelly | Aug. 18, 1931 |
| 2,678,249 | Rhoads | May 11, 1954 |

FOREIGN PATENTS

| | | |
|---|---|---|
| 310,651 | Great Britain | May 2, 1921 |
| 381,625 | Great Britain | Oct. 13, 1932 |
| 392,789 | France | Dec. 4, 1908 |
| 439,898 | Great Britain | Dec. 17, 1935 |